US007600812B2

(12) United States Patent
Godbout

(10) Patent No.: US 7,600,812 B2
(45) Date of Patent: Oct. 13, 2009

(54) TRANSPORTABLE SHELTER APPARATUS WITH HEATED SEAT FOR ICE-FISHING AND HUNTING

(76) Inventor: Emil E. Godbout, 1510 Douglas Rd., Carlton, MN (US) 55718

( * ) Notice: Subject to any disclaimer, the term of this patent is extended or adjusted under 35 U.S.C. 154(b) by 420 days.

(21) Appl. No.: 11/309,175

(22) Filed: Jul. 6, 2006

(65) Prior Publication Data

US 2008/0006260 A1    Jan. 10, 2008

(51) Int. Cl.
*A47C 31/00*    (2006.01)
(52) U.S. Cl. ............................... 297/180.1; 297/180.15; 297/184.15; 43/17; 43/4; 135/96
(58) Field of Classification Search .............. 297/180.1, 297/180.15, 184.14, 184.15, 184.11; 43/17, 43/57.1, 4, 4.5, 54.1; 135/96, 901, 92
See application file for complete search history.

(56) References Cited

U.S. PATENT DOCUMENTS

| | | | | |
|---|---|---|---|---|
| 2,904,031 | A * | 9/1959 | Scott | 126/204 |
| 3,030,122 | A * | 4/1962 | Madera | 280/28.12 |
| 3,170,458 | A * | 2/1965 | Leonard | 126/271.3 |
| 4,131,107 | A * | 12/1978 | Godbout | 126/271.2 R |
| 4,438,940 | A * | 3/1984 | Hunt | 280/19.1 |
| 4,945,668 | A * | 8/1990 | Keller | 43/17 |
| 5,133,378 | A * | 7/1992 | Tanasychuk | 135/148 |
| 5,341,588 | A * | 8/1994 | Lizotte | 43/1 |
| 5,368,057 | A * | 11/1994 | Lubkeman et al. | 135/133 |
| 5,598,656 | A * | 2/1997 | Strasser | 43/17 |
| 5,622,198 | A * | 4/1997 | Elsinger | 135/128 |
| 6,088,945 | A * | 7/2000 | Sanderfoot | 43/4 |
| 6,296,002 | B1 * | 10/2001 | Tashchyan | 135/96 |
| 6,397,870 | B1 * | 6/2002 | Makedonsky et al. | 135/116 |
| 6,962,221 | B1 * | 11/2005 | Carrette | 180/9.1 |
| 7,185,456 | B1 * | 3/2007 | Schoenecker et al. | 43/17 |

* cited by examiner

*Primary Examiner*—Laurie K Cranmer
(74) *Attorney, Agent, or Firm*—The Rudy Law Firm; William T. Helwig

(57) ABSTRACT

A transportable shelter providing convective heat and a heated seat for the user's comfort, and providing heat to prevent the formation of ice in an enclosed fish hole when ice-fishing. Generally a box-like design, where the front of the box has no bottom or top, and is placed over a fish hole when ice-fishing. The rear of the box has a seat mounted thereon over a partial bottom, overlooking the front opening. A heat source is placed on the partial bottom, under a heat deflector, creating a heating chamber which provides heat for the seat, directs escaping heat to the user, and which will keep a fish hole from freezing over. A canopy frame attaches, over which a tarp can be draped containing heat and providing additional shelter from extreme weather. A sled or wagon assembly is provided for pulling the unit out to a spot for ice-fishing or hunting.

16 Claims, 2 Drawing Sheets

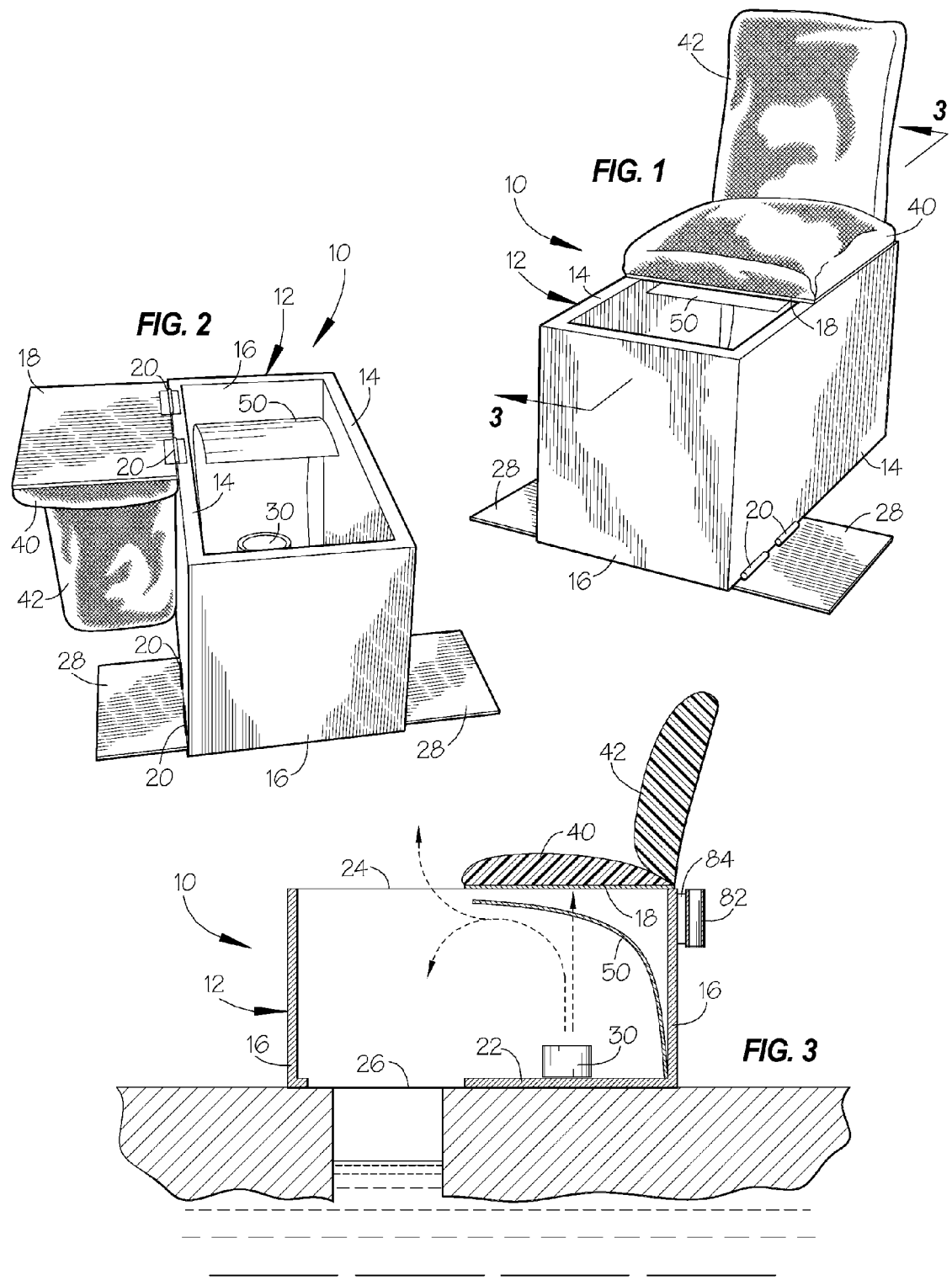

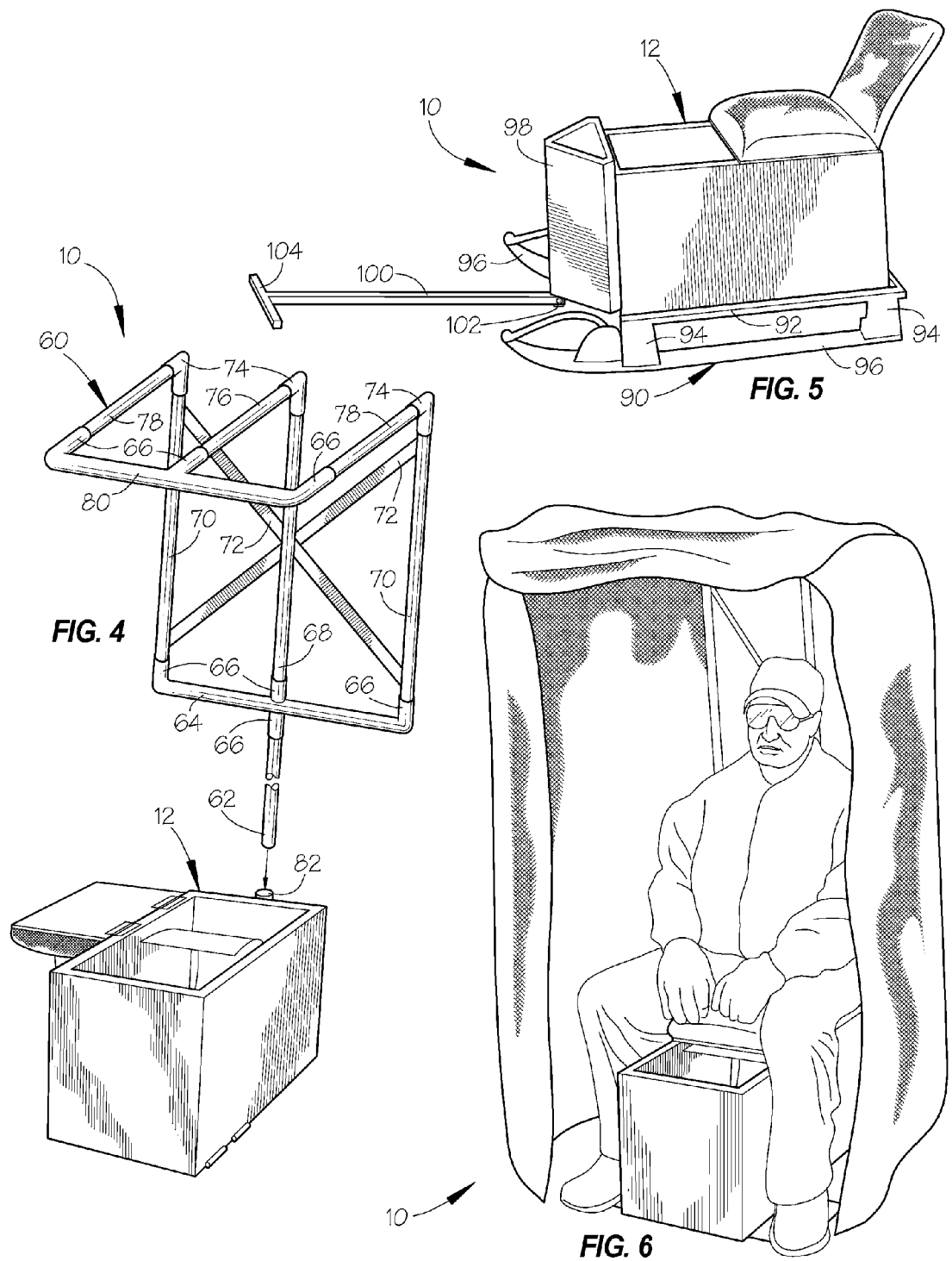

TRANSPORTABLE SHELTER APPARATUS WITH HEATED SEAT FOR ICE-FISHING AND HUNTING

BACKGROUND OF INVENTION

The invention relates to an apparatus for providing heat to prevent the formation of ice at a fish hole when ice-fishing, and providing a heated seat and convective heat for the user's comfort when ice-fishing or hunting, while also providing an attachable canopy and transport sled for the users additional comfort and ease of use.

Numerous patents have been developed to aid individuals interested in ice fishing with keeping their ice fishing hole from freezing over. Many inventors have tried to improve on this inventor's prior U.S. Pat. No. 4,131,107 issued Dec. 26, 1978 to Godbout. Most include some type of containment design around the ice hole, similar to Godbout. One makes use of a semi-collapsible design similar to Godbout. Many include a tip-up device for alerting when a fish is on the line as an improvement.

This inventor's prior design (Godbout) called for use of a combustible internal heat source such as "Sterno" T.M canned heat, a gelled alcohol chafing fuel of low volatility. Many follow-on patents use candles as an internal heat source (see U.S. Pat. No. 5,598,656 issued to Strasser; U.S. Pat. No. 4,945,668 issued to Keller; U.S. Pat. No. 5,282,333 issued to Klinkhamer), although some rely on other combustible materials as an internal heat source such as charcoal briquettes (see U.S. Pat. No. 4,662,099 issued to Stewart; U.S. Pat. No. 4,253,262 issued to Johnson), and several make use of solar energy designs (see U.S. Pat. No. 4,980,986 issued to Harper; U.S. Pat. No. 4,953,317 issued to Ruchel).

These prior art ice-fishing device designs are small portable units which are sized to enclose a fish hole in the ice, and do not anticipate a larger enclosure to provide for a heated seat or an attachable canopy as part of a transportable shelter. These prior art designs also make use of heat sources which are not as stable or consistent as this inventor's prior design (Godbout) and therefore cannot provide predictable performance with varying temperature conditions. None of these prior art designs provide heat or shelter for the comfort of the user.

Numerous other patents have been developed to aid individuals in keeping warm while hunting or fishing by providing for a heated seat for the user to sit on. Following are the most relevant examples: U.S. Pat. No. 6,705,308 issued Mar. 16, 2004 to Hubscher is a Person Heating Device, which provides for a pail type design with the preferred design using a liquid fuel burner to produce heat for heating a seat and venting heat into the users clothing; U.S. Pat. No. 5,405,186 issued Apr. 11, 1995 to Hanson et al. is a Heated Seat Device which provides for a cylindrical stool type design with the preferred design using a pressurized gas burner to produce heat for heating a seat and venting heat into the users clothing; U.S. Pat. No. 3,024,782 issued Mar. 13, 1962 to F. A. Knopps is a Heated Seat which provides for a pail type design using a liquid fuel burner to produce heat for heating a seat and venting heat into the users clothing; U.S. Pat. No. 2,904,031 issued Sep. 15, 1959 to V. L. Scott is a Hot Seat which provides for a pail type design using an internal charcoal stove to produce heat for heating a seat and venting heat into the users clothing.

These prior art heated seat designs all provide for a simple portable stool type of seating arrangement with excess heat being vented into the users clothing and do not anticipate a larger enclosure to provide for the enclosure of a fish hole in the ice or for an attachable canopy as part of a transportable shelter. None of these prior art heated seat designs provide heat to prevent the formation of ice at an enclosed fish hole while ice-fishing. None of these prior art heated seat designs provide an attachable canopy to contain the escaping heat and to provide protection from extreme weather conditions for the user. None of these prior art heated seat designs provide for a transportation means, and must be hand carried to a desired location.

Ice-fishing and winter hunting can involve temperatures ranging from thirty degrees Fahrenheit above zero to thirty degrees Fahrenheit below zero or colder, making a simple heated seat that is adequate when temperatures are higher entirely lacking when temperatures drop significantly lower, where the user's comfort becomes a significant issue. If there is any wind, even warmer temperatures can feel cold, and lighting a candle or charcoal even in a semi-protected enclosure can be difficult if not impossible, and lower temperatures with significant windchill can rob heat even more quickly, making the user's comfort a priority and causing ice holes to freeze over quickly even when protected with prior art devices.

What is needed then, is a transportable sheter apparatus which provides additional heat and shelter for the user while providing predictable heat for melting ice at a fish hole along with heat for the users comfort, which makes use of a heat source that is portable, easy to start, available in large and small heating sizes to produce higher or lower heat, and will provide predictable and consistent heat which is simple and easy to use. What is further needed is a transportable sheter apparatus which allows for quick and efficient setup, which is transportable for ease of moving to and from a fish hole or hunting blind, which is inexpensive enough that anyone interested in ice-fishing can afford to own and use it, and in particular, which includes an optional canopy shelter for additional protection from severe weather conditions and which will help capture and contain escaping heat to retain warmth even in extreme cold.

SUMMARY OF INVENTION

A transportable shelter apparatus providing convective heat and a heated seat for the user's comfort, and providing heat to prevent the formation of ice in an enclosed fish hole when ice-fishing. Generally a box-like enclosure having sidewalls and end-walls, where the front of the enclosure has no top, and half-doors covering the bottom which are opened out when the enclosure is placed over a fish hole when ice-fishing and through which a fish line is extended by the user when fishing at a hole in the ice. The rear of the enclosure has a seat mounted thereon over a partial bottom, overlooking the front opening. A heat source is placed on the partial bottom, under a heat deflector, creating a heating chamber adjacent to the open bottom portion, and which provides heat for heating the seat for the users comfort. The heat deflector directs excess heat forward to the open bottom portion enclosing the fish hole (when ice-fishing), and preventing ice from forming and thereby keeping the fish hole from freezing over. The excess heat then rises, escaping out the open top portion past the seated user, providing convective heat to warm the user's hands, face and body. A canopy frame attaches, over which a tarp can be draped to contain the escaping heat and providing additional shelter from extreme weather conditions. A sled assembly is provided for pulling the enclosure out to a spot for ice-fishing and to which wheels may also be attached creating a wagon like arrangement for pulling the enclosure when hunting in conditions unsuitable for sled skis.

BRIEF DESCRIPTION OF DRAWINGS

The present invention may be understood from the description of the embodiment which follows and from the accompanying drawings. The drawings are hereby expressly made a part of the specification.

FIG. 1 is a perspective view of a transportable shelter apparatus with heated seat for ice fishing and hunting in operative condition, with the front bottom half-doors opened over a fish hole in the ice, but without the canopy frame attached, and embodying the invention when setup for use while ice-fishing in favorable winter weather conditions.

FIG. 2 is an alternate perspective view of the transportable shelter apparatus depicted in FIG. 1 with the seat flipped open for access to the heat chamber and heat source contained therein.

FIG. 3 is a sectional view of the transportable shelter apparatus depicted in FIG. 1, on the line 3-3 of FIG. 1.

FIG. 4 is a perspective view of the transportable shelter apparatus depicted in FIG. 2, with the attachable canopy frame shown ready for insertion into the canopy frame receiver, and with the front bottom half-doors closed, and embodying the invention when being setup for use while hunting.

FIG. 5 is a perspective view of the transportable shelter apparatus depicted in FIG. 1, while sitting on the provided transport sled.

FIG. 6 is a perspective view of the transportable shelter apparatus depicted in FIG. 1, as it would appear when setup with canopy frame attached and a tarpaulin draped thereon, and embodying the invention when in use for ice-fishing or hunting in less favorable weather conditions.

DETAILED DESCRIPTION

Reference is made herein to the attached drawings. Like reference numerals are used throughout the various drawings to depict like or similar elements of the claimed transportable shelter apparatus with heated seat for ice fishing and hunting. For the purpose of presenting a brief and clear discussion of the transportable shelter apparatus, the preferred embodiment will be discussed primarily as used for ice-fishing. This is for representative purposes only and should not be construed as limiting in any manner.

Referring now to FIG. 1, the preferred embodiment 10 of the transportable shelter apparatus is seen as it would appear when the seat base enclosure assembly 12 is positioned over a fish hole in the ice for ice fishing, after being unloaded from the transport sled assembly 12 depicted in FIG. 5, and without having attached the canopy frame assembly 60 depicted in FIG. 4, and embodying the invention when setup for use while ice-fishing in favorable winter weather conditions.

FIGS. 1, 2 and 3 when viewed together, provide greater detail of the transportable shelter apparatus 10 in this configuration and of its primary components. A seat base enclosure assembly 12, is provided and is comprised of an enclosure 12 having first and second sidewalls 14 fixedly connected to front and rear end-walls 16 enclosing a space, having a seat 40 end enclosing a rear space and an access opening 24 end enclosing a front space, said seat 40 end being bounded by said rear end-wall 16 and the rear portion of said first and second sidewalls 14, said access-opening 24 end being bounded by said front end-wall 16 and the front portion of said first and second sidewalls 14.

A partial cover 18 is provided for said enclosure 12 hingedly attached on one side to said seat 40 end of said enclosure 12, and whereby said partial cover 18 extends over and rests upon the top edge of said rear end-wall 16 and the top edge of the rear portion of said first and second sidewalls 14, and wherein the hinged 20 side of said partial cover 18 may be attached by said hinges 20 to the top of the first or second sidewall 14 upon which it rests, while covering said seat 40 end of said enclosure 12, and bounding said rear space from above, and creating an axis along the hinged 20 side of said partial cover 18 and the enclosure 12 top edge to which it is attached, about which said partial cover 18 may be rotated, thereby creating an access opening in said seat 40 end of said enclosure 12, which will open to the left or the right depending upon which sidewall 14 the hinges 20 are attached. The hinged 20 partial cover 18 on the rear portion of the enclosure 12 allows for easy access to the rear space which it encloses.

A partial bottom 22 is provided for said enclosure 12 fixedly attached to the bottom edge of said rear end-wall 16 and to the bottom edge of the rear portion of said first and second sidewalls 14, creating a bottom for said seat 40 end of said enclosure 12, adapted to receive heating means 30 upon the inner surface thereof, and bounding said rear space from below, and being beneath and substantially in alignment with said partial cover 18, creating a heated chamber within said rear space for the retention of heat from a heating means 30 which is preferably a chafing fuel burner containing gelled alcohol for providing a portable and consistent heat source with low volatility.

An access-opening 24 is provided in the top of said enclosure 12 extending from the top edge of said front end-wall 16 to the front edge of said partial cover 18 and extending between the top edges of the front portions of said first and second sidewalls 14, thereby bounding said access-opening 24 end of said enclosure 12 and said front space from above, and allowing heat to rise and escape to the user, providing convective heat to warm the hands, face and body of a user seated on said seat 40 end of said enclosure 12 for the users comfort, and also allowing the user access into and through said enclosure 12 to a fish hole for ice fishing.

A bottom opening 26 is provided in said enclosure 12 extending from the bottom edge of said front end-wall 16 to the front edge of said partial bottom 22 and extending between the bottom edges of the front portions of said first and second sidewalls 14, thereby bounding said access-opening 24 end of said enclosure 12 and said front space from below.

A pair of front bottom half-doors 28 which each fit within and close off one-half of said bottom opening 26 when closed, with each said front bottom half-door 28 being hingedly 20 attached by an outside edge to the bottom edge of the front portion of said first and second sidewalls 14, and creating an axis along the hinged 20 outside edge of each said front bottom half-door 28 and the enclosure 12 bottom sidewall 14 edge to which it is attached, about which said front bottom half-doors 28 may be rotated, thereby closing off or opening said bottom opening 26 of said enclosure 12, and which when opened allows the user access therethrough to a fish hole in the ice for ice fishing, while also allowing enclosure 12 heat access therethrough to said fish hole to prevent the formation of ice while ice fishing. The front bottom half-doors 28 may be provided with a simple latch to prevent them from swinging open during transport.

A contoured seat 40 is provided and is fixedly attached to said partial cover 18 with the front of said seat 40 facing said access opening 24 in the top of said enclosure 12, and with the rear of said seat having an attached backrest 42 providing added comfort and support for the user. The partial cover 18 is made of a flame resistant material which will absorb and retain heat and which will provide for the efficient transfer of heat to the attached seat 40. The seat 40 is made of a flame resistant material which will absorb and retain heat for the comfort of the user.

A heat deflector 50 is provided comprising a rectangular sheet of metal, having an attachment end and a free end, said heat deflector 50 being attached by said attachment end to the top rear end of said partial bottom 22, and adjacent to said rear end-wall 16, the body of said heat deflector 50, being narrower than the width of said enclosure 12 by an appropriate amount to allow a portion of rising heat from said heat source 30, which is located under said heat deflector 50 to bypass said heat deflector 50 to warm said partial cover 18 and said attached seat 40, as can be seen in FIG. 3 by the dashed lines indicating heat flow from the heat source 30. Said heat deflector 50 is arced upwards and forwards from its attached end towards the bottom front end of said partial cover 18, wherein said free end of said heat deflector 50 stops and is positioned an appropriate distance below the front end of said partial cover 18 to properly distribute heat within said enclosure 12 and prevent said partial cover 18 and attached seat 40 from becoming overheated. As can be seen in FIG. 3 by the dashed lines indicating heat flow from the heat source 30, the heat deflector 50 directs a portion of heat produced by said heat source 30 forward towards said bottom opening 26 and a fish hole over which it lies, to prevent the formation of ice while ice-fishing, and additional excess heat rises out of the access opening 24 in the top of said enclosure 12 to warm the user. The heat deflector 50 is constructed of a fire-proof material and is of a bendable nature and may be adjusted by bending the top end of said heat deflector 50 up or down.

FIG. 4 provides a perspective view of the transportable shelter apparatus 10 and a detailed view of its attachable canopy frame assembly 60 shown ready for insertion into the canopy frame receiver 82, said frame receiver 82, being attached to the upper outside end of said rear end-wall 16 of said enclosure 12 by a frame receiver attachment bracket 84 which can be seen in FIG. 3. The canopy frame assembly 60 is appropriately sized to provide overhead support for a tarpaulin or other appropriate material, which when draped over said canopy frame assembly 60 in a sufficient length to reach the ground on the back and both sides of said seat base enclosure assembly 12, while remaining open to the front, will produce a tent-like configuration for containing escaping heat from said seat base enclosure assembly 12, while also providing additional shelter from extreme weather conditions for a seated user, and is constructed of a lightweight tube frame, comprising: a main support tube 62 which inserts into and attaches to said canopy frame receiver 82 of said apparatus 10 and extends generally upwards therefrom; a bottom cross tube 64 is provided which is centrally attached to the upper end of said main support tube 62 and perpendicular thereto, and parallel to said rear end-wall 16 of said enclosure 12, by insertion of said main support tube 62 into a flange 66 depending downward from the bottom center of said bottom cross tube 64; a vertical center frame tube 68 attached to the top center of said bottom cross tube 64 by insertion into an upward depending flange 66 therefrom, said center frame tube 68 then rising to an over head position; a vertical outer frame tube 70 attached to each outside end of said bottom cross tube 64 by insertion into an upward depending flange 66 therefrom and thence rising to an overhead position; a frame tube elbow 74 attached to the top of said vertical center tube 68 and each of said vertical outer frame tubes 70, and configured to point forward therefrom; a horizontal center frame tube 76 attached to the forward facing end of said center frame tube elbow 74; a horizontal outer frame tube 78 attached to the forward facing end of each said outer frame tube elbows 74; and a front cross tube 80 centrally attached to the front end of said horizontal center frame tube 76 by insertion of said center frame tube 76 into flange 66 depending rearward from the center of said front cross tube 80, and with each end of said front cross tube 80 attached to the front ends of said horizontal outer frame tubes 78 by insertion of said horizontal outer frame tubes 78 into flanges 66 depending rearward from each end of said front cross tube 80; and two x-braces 72 attached to and connecting the bottom end of one vertical outer frame tube 70 to the top end of the opposite vertical outer frame tube 70. Flange 66 ends and elbow 74 ends may be of a pressure/friction connection with said tube frame sections, or of a twist lock design, allowing for quick breakdown and storage of said canopy frame assembly. The canopy frame assembly 60 is constructed of aluminum or a light weight high strength plastic or composite material, or any other suitable material.

FIG. 5 provides a perspective view of the transportable shelter apparatus 10 and a detailed view of its transport sled assembly 90, with said seat base enclosure assembly 12 mounted thereon, comprising: a rectangular support frame 92 having an outer vertical edge and a bottom horizontal edge, of an appropriate size such that the bottom of said seat base enclosure assembly 12 will fit securely within said outer vertical edge of said rectangular support frame 92 while resting upon said bottom horizontal edge of said rectangular support frame 92 for transport; a ski mounting bracket 94 extending downwards from each corner of said rectangular support frame 92 and attached thereto; a snowmobile type ski 96 having a front end and a back end, one said ski 96 being attached to each side of said rectangular support frame 92 by two said ski mounting brackets 94, wherein one said ski mounting bracket 94 is attached to the front end of each said ski 96 and one said mounting bracket 94 is attached to the back end of each said ski 96 such that each said ski 96 is attach below and parallel to the longer outside edges of said rectangular support frame 92; a nose storage compartment 98 attached to the front of said rectangular support frame 92, providing strength and rigidity to said rectangular support frame 92 while also providing storage for said canopy support frame assembly 60 in broken down form, and a tow bar 100 attached to the lower front end of said nose storage compartment 98 by a swivel attachment 102 and said tow bar 100 having a handle 104 at the unattached end by which said transport sled may be pulled to a desired location.

FIG. 6 provides a perspective view of the transportable shelter apparatus as it would appear when setup with canopy attached, and in use for ice-fishing. The apparatus is positioned with the front bottom half-doors being opened and the front open bottom portion of the enclosure placed over a hole in the ice. The heat source provides heat to prevent ice from forming in the fish hole and to heat the user's seat, while excess heat rises out of the top opening to provide warmth for the user. The canopy frame supports a tarpaulin which provides protection from extreme weather conditions while also helping to retain escaping heat. The possibility of fish on a line can be easily viewed through the access opening on the front of the apparatus.

The apparatus is easily transported to a suitable location on the ice by use of the transport sled. The apparatus enclosure assembly may be constructed of metal, a non-brittle high-heat resistant plastic or composite, or any other suitable material, and may be constructed by securing sidewalls, end-walls and the partial bottom to each other or by securement to a structural frame for added strength and rigidity.

The method and embodiment of the present invention shown and discussed are by way of illustration and not of limitation, and a wide variety of equivalent methods and embodiments may be made without departing from the spirit or scope of the invention.

What is claimed is:

1. A transportable shelter apparatus with heated seat for ice fishing and hunting comprising:
   a seat base enclosure means which will support a seated user, and which will enclose, retain and distribute heat from a heat source, and which will also enclose a fish hole when ice fishing, having a seat end which provides a place for the user to sit, and an access opening end which allows heat to escape to the user and also provides access to a fish hole for ice fishing;
   a heating means contained within said seat base enclosure means, which provides heat to warm the seat end of said enclosure for the comfort of the user, which provides escaping heat to the access opening end of said enclosure for the further comfort of the user, and which provides heat to prevent the formation of ice in a fish hole for ice fishing;
   a seating means attached to said seat end of said seat base enclosure means, which provides a comfortable place for the user to sit, which absorbs heat from said heating means for the comfort of the user, which faces said access opening end of said enclosure and the escaping heat therefrom for the further comfort of the user, and which also allows a seated user to overlook a fish hole for ice fishing; and
   a heat deflecting means by which heat produced by said heating means is distributed between said access opening end and said seat end of said seat base enclosure means, whereby said seating means is kept appropriately warm for the users comfort without becoming overheated, while excess heat is directed to escape to the user, and whereby heat is appropriately directed to prevent the formation of ice in a fish hole for ice fishing; and
   wherein said seat base enclosure means is comprised of an enclosure having first and second sidewalls connected to front and rear end-walls enclosing a space, having a seat end enclosing a rear space and an access opening end enclosing a front space, said seat end being bounded by said rear end-wall and the rear portion of said first and second sidewalls, said access-opening end being bounded by said front end-wall and the front portion of said first and second sidewalls;
   a partial cover for said enclosure attached to the top edge of said rear end-wall and to the top edge of the rear portion of said first and second sidewalls, and covering said seat end of said enclosure, and bounding said rear space from above;
   a partial bottom for said enclosure attached to the bottom edge of said rear end-wall and to the bottom edge of the rear portion of said first and second sidewalls, creating a bottom for said seat end of said enclosure, adapted to receive heating means upon the inner surface thereof, and bounding said rear space from below, and being beneath and substantially in alignment with said partial cover, creating a heated chamber within said rear space for the retention of heat from a heating means;
   a top opening in said enclosure extending from the top edge of said front end-wall to the front edge of said partial cover and extending between the top edges of the front portions of said first and second sidewalls, thereby bounding said access-opening end of said enclosure and said front space from above, and allowing heat to rise and escape to the user, providing warmth to the hands, face and body of a user seated on said seat end of said enclosure for the users comfort, and also allowing the user access into and through said enclosure to a fish hole for ice fishing; and
   a bottom opening in said enclosure extending from the bottom edge of said front end-wall to the front edge of said partial bottom and extending between the bottom edges of the front portions of said first and second sidewalls, thereby bounding said access-opening end of said enclosure and said front space from below, and allowing the user access therethrough to a fish hole in the ice for ice fishing, and allowing enclosure heat access therethrough to said fish hole to prevent the formation of ice while ice fishing.

2. The transportable shelter apparatus according to claim 1, wherein said enclosure includes a metal framework to which the perimeter of each sidewall and end-wall is attached, for added strength and rigidity, and wherein the framework members fit within the perpendicular intersections of said sidewalls and end-walls, and within the perpendicular intersections of said partial cover and said partial bottom with said sidewalls and said end-walls.

3. The transportable shelter apparatus according to claim 1, wherein said partial cover is hingedly attached on one side to said seat end of said enclosure, and whereby said partial cover extends over and rests upon the top edge of said rear end-wall and the top edge of the rear portion of said first and second sidewalls, and wherein the hinged side of said partial cover may be attached to any of the three sides of said enclosure upon which it rests, while covering said seat end of said enclosure, and bounding said rear space from above, and creating an axis along the hinged side of said partial cover and the enclosure edge to which it is attached, about which said partial cover may be rotated, thereby creating an access opening in said seat end of said enclosure.

4. The transportable shelter apparatus according to claim 1, wherein said heating means is a portable heat source with low volatility which is placed upon said partial bottom within said rear space thereby creating a heated chamber.

5. The transportable shelter apparatus according to claim 1, wherein said seating means is of a chair-like configuration having a contoured seat attached to said partial cover with an attached backrest providing added comfort and support to the user.

6. The transportable shelter apparatus according to claim 1, wherein said heat deflecting means is a heat deflector comprising a rectangular sheet of metal, having an attachment end and a free end, said heat deflector being attached by said attachment end to the top rear end of said partial bottom, and adjacent to said rear end-wall, the body of said heat deflector, being narrower than the width of said enclosure by an appropriate amount to allow rising heat to warm said partial cover and said attached seat, is arced upwards and forwards towards the bottom front end of said partial cover, wherein said free end of said heat deflector stops and is positioned an appropriate distance below the front end of said partial cover to properly distribute heat within said enclosure and prevent said partial cover and attached seat from becoming overheated.

7. A transportable shelter apparatus with heated seat for ice fishing and hunting comprising:
   a seat base enclosure means which will support a seated user, and which will enclose, retain and distribute heat from a heat source, and which will also enclose a fish hole when ice fishing, having a seat end which provides a place for the user to sit, and an access opening end which allows heat to escape to the user and also provides access to a fish hole for ice fishing;

a heating means contained within said seat base enclosure means, which provides heat to warm the seat end of said enclosure for the comfort of the user, which provides escaping heat to the access opening end of said enclosure for the further comfort of the user, and which provides heat to prevent the formation of ice in a fish hole for ice fishing;

a seating means attached to said seat end of said seat base enclosure means, which provides a comfortable place for the user to sit, which absorbs heat from said heating means for the comfort of the user, which faces said access opening end of said enclosure and the escaping heat therefrom for the further comfort of the user, and which also allows a seated user to overlook a fish hole for ice fishing; and a heat deflecting means by which heat produced by said heating means is distributed between said access opening end and said seat end of said seat base enclosure means, whereby said seating means is kept appropriately warm for the users comfort without becoming overheated, while excess heat is directed to escape to the user, and whereby heat is appropriately directed to prevent the formation of ice in a fish hole for ice fishing; and wherein said apparatus includes an attachment means and
a canopy support means which attaches thereto and which on attachment provides overhead support for a tarpaulin-like material which when draped over said canopy support means in a sufficient length to reach the ground on the back and both sides of said seat base enclosure means, while remaining open to the front, will produce a tent-like configuration for containing escaping heat from said seat base enclosure means, and providing additional shelter from extreme weather for a seated user.

8. The transportable shelter apparatus according to claim 7, wherein said canopy support means is a lightweight tube frame appropriately sized to provide canopy cover over said enclosure and a user seated thereon, comprising:

a main support tube which attaches to said attachment means of said apparatus and extends generally upwards therefrom;

a bottom cross tube which is centrally attached to the upper end of said main support tube and perpendicular thereto, and parallel to said rear end-wall of said enclosure;

a vertical center frame tube attached to the top center of said bottom cross tube and rising to an over head position;

a vertical outer frame tube attached to each outside end of said bottom cross tube and rising to an overhead position;

a frame tube elbow attached to the top of said vertical center tube and each of said vertical outer frame tubes, and configured to point forward therefrom;

a horizontal center frame tube attached to the forward facing end of said center frame tube elbow;

a horizontal outer frame tube attached to the forward facing end of each said outer frame tube elbows; and a front cross tube centrally attached to the front end of said horizontal center frame tube with each end attached to the front ends of said horizontal outer frame tubes.

9. The transportable shelter apparatus according to claim 7, wherein said apparatus includes a transport means; and wherein said transport means is a convertible sled to wagon assembly, comprising:

a rectangular support frame having an outer vertical edge and a bottom horizontal edge, of an appropriate size such that the bottom of said seat base enclosure means will fit securely within said outer vertical edge of said support frame while resting upon said bottom horizontal edge of said support frame for transport;

a ski mounting bracket extending downwards from each corner of said rectangular support frame and attached thereto;

a snowmobile type ski having a front end and a back end, one said ski being attached to each side of said rectangular support frame by two said ski mounting brackets, wherein one said mounting bracket is attached to the front end of each said ski and one said mounting bracket is attached to the back end of each said ski such that each said ski is attach below and parallel to the longer outside edges of said rectangular support frame; and a tow bar attached to the front end of said rectangular support frame by which said convertible sled may be pulled to a desired location.

10. A transportable shelter apparatus with heated seat for ice fishing and hunting comprising:

an enclosure having first and second sidewalls connected to front and rear end-walls enclosing a space, having a seat end enclosing a rear space and an access opening end enclosing a front space, said seat end being bounded by said rear end-wall and the rear portion of said first and second sidewalls, said access-opening end being bounded by said front end-wall and the front portion of said first and second sidewalls;

a partial cover for said enclosure attached to the top edge of said rear end-wall and to the top edge of the rear portion of said first and second sidewalls, and covering said seat end of said enclosure, and bounding said rear space from above;

a partial bottom for said enclosure attached to the bottom edge of said rear end-wall and to the bottom edge of the rear portion of said first and second sidewalls, creating a bottom for said seat end of said enclosure, adapted to receive heating means upon the inner surface thereof, and bounding said rear space from below, and being beneath and substantially in alignment with said partial cover, creating a heated chamber within said rear space for the retention of heat from a heating means;

a top opening in said enclosure extending from the top edge of said front end-wall to the front edge of said partial cover and extending between the top edges of the front portions of said first and second sidewalls, thereby bounding said access-opening end of said enclosure and said front space from above, and allowing heat to rise and escape to the user, providing warmth to the hands, face and body of a user seated on said seat end of said enclosure for the users comfort, and also allowing the user access into and through said enclosure to a fish hole for ice fishing; and a bottom opening in said enclosure extending from the bottom edge of said front end-wall to the front edge of said partial bottom and extending between the bottom edges of the front portions of said first and second sidewalls, thereby bounding said access-opening end of said enclosure and said front space from below, and allowing the user access therethrough to a fish hole in the ice for ice fishing, and allowing enclosure heat access therethrough to said fish hole to prevent the formation of ice while ice fishing;

a portable heat source with low volatility which is placed upon said partial bottom within said rear space thereby creating a heated chamber;

a contoured seat attached to said partial cover with an attached backrest providing added comfort and support to the user;

a heat deflector comprising a rectangular sheet of metal, having an attachment end and a free end, said heat deflector being attached by said attachment end to the top rear end of said partial bottom, and adjacent to said rear end-wall, the body of said heat deflector, being narrower than the width of said enclosure by an appropriate amount to allow rising heat to warm said partial cover and said attached seat, is arced upwards and forwards towards the bottom front end of said partial cover, wherein said free end of said heat deflector stops and is positioned an appropriate distance below the front end of said partial cover to properly distribute heat within said enclosure and prevent said partial cover and attached seat from becoming overheated;

an attachment means and a canopy support means which attaches thereto and which on attachment provides overhead support for a tarpaulin-like material which when draped over said canopy support means in a sufficient length to reach the ground on the back and both sides of said seat base enclosure means, while remaining open to the front, will produce a tent-like configuration for containing escaping heat from said seat base enclosure means, and providing additional shelter from extreme weather for a seated user; and a transport means for transporting said apparatus to a suitable location for ice-fishing or hunting.

11. The transportable shelter apparatus according to claim 10, wherein said apparatus is constructed from steel.

12. The transportable shelter apparatus according to claim 10, wherein said apparatus is constructed from aluminum.

13. The transportable shelter apparatus according to claim 10, wherein said apparatus is constructed from stainless steel.

14. The transportable shelter apparatus according to claim 10, wherein said apparatus is constructed from metal alloys.

15. The transportable shelter apparatus according to claim 10, wherein said apparatus is constructed from high-strength flame-resistant composites.

16. The transportable shelter apparatus according to claim 10, wherein said heating means is a chafing fuel burner containing gelled alcohol which when ignited is placed upon said partial bottom within said rear space thereby creating a heated chamber.

* * * * *